(12) United States Patent
Kirkham et al.

(10) Patent No.: US 10,710,748 B2
(45) Date of Patent: Jul. 14, 2020

(54) AIRCRAFT PART ASSEMBLY

(71) Applicant: BAE SYSTEMS PLC, London (GB)

(72) Inventors: Andrew John Kirkham, Lancashire (GB); David Mark Bradbury, Lancashire (GB)

(73) Assignee: BAE Systems plc, London (GB)

( * ) Notice: Subject to any disclaimer, the term of this patent is extended or adjusted under 35 U.S.C. 154(b) by 73 days.

(21) Appl. No.: 15/746,870

(22) PCT Filed: Aug. 1, 2016

(86) PCT No.: PCT/GB2016/052367
§ 371 (c)(1),
(2) Date: Jan. 23, 2018

(87) PCT Pub. No.: WO2017/021722
PCT Pub. Date: Feb. 9, 2017

(65) Prior Publication Data
US 2019/0248514 A1 Aug. 15, 2019

(30) Foreign Application Priority Data

Aug. 5, 2015 (EP) ..................................... 15275184
Aug. 5, 2015 (GB) .................................. 1513823.3

(51) Int. Cl.
*B64F 5/10* (2017.01)
*B64F 5/50* (2017.01)

(52) U.S. Cl.
CPC . *B64F 5/10* (2017.01); *B64F 5/50* (2017.01)

(58) Field of Classification Search
CPC ..... B64F 5/10; B64F 5/50; B25H 1/00; B25H 1/02; B25H 1/06; B25H 1/08; B25H 1/10
(Continued)

(56) References Cited

U.S. PATENT DOCUMENTS

| 4,894,903 A |   | 1/1990 | Woods |
|---|---|---|---|
| 4,995,146 A | * | 2/1991 | Woods .................... B25B 5/003 269/45 |

(Continued)

FOREIGN PATENT DOCUMENTS

| CN | 102581615 | 7/2012 |
|---|---|---|
| FR | 635208 A | 3/1928 |
| GB | 585408 A | 2/1947 |

OTHER PUBLICATIONS

International Preliminary Report on Patentability of International Application No. PCT/GB2016/052367, dated Feb. 6, 2018, 9 pages.

(Continued)

*Primary Examiner* — Christopher M Koehler
(74) *Attorney, Agent, or Firm* — Maine Cernota & Rardin

(57) ABSTRACT

A method of producing part of an aircraft comprising: providing a frame having a first surface, a second surface, and one or more side edges between the first and second surfaces; mounting the frame to a first tool, the first tool comprising a support surface that contacts the second surface of the frame to opposing movement of the frame; while the frame is mounted to the first tool, machining the first surface to form attachment features; mounting the machined frame to a second tool which contacts with the frame at only the one or more side edges; and, while the frame is mounted to the second tool, attaching, using the attachment features, to the first and second surfaces, aircraft panels to form an outer skin.

17 Claims, 4 Drawing Sheets

(58) Field of Classification Search
USPC ........................................ 269/46, 303, 289 R
See application file for complete search history.

(56) References Cited

U.S. PATENT DOCUMENTS

| | | | | |
|---|---|---|---|---|
| 5,033,178 | A * | 7/1991 | Woods | B25B 11/00 29/243.57 |
| 5,090,648 | A * | 2/1992 | Wood, IV | B05B 13/0228 248/125.3 |
| 5,341,556 | A * | 8/1994 | Shubin | B64C 3/26 29/448 |
| 6,314,630 | B1 * | 11/2001 | Munk | B23P 21/00 29/407.01 |
| 6,702,269 | B1 * | 3/2004 | Tadich | B27F 7/155 269/304 |
| 7,584,947 | B2 * | 9/2009 | Freeland | B23Q 1/035 269/21 |
| 9,272,338 | B2 * | 3/2016 | Fujita | B23B 41/00 |
| 10,017,277 | B2 * | 7/2018 | DesJardien | B64F 5/50 |
| 2001/0020762 | A1 * | 9/2001 | Helm | B23Q 1/032 269/21 |
| 2002/0148271 | A1 * | 10/2002 | Schiavi | B23Q 1/012 72/340 |
| 2003/0207742 | A1 * | 11/2003 | Hazlehurst | B21C 51/005 483/36 |
| 2004/0040154 | A1 | 3/2004 | Day et al. | |
| 2004/0093731 | A1 * | 5/2004 | Sarh | B21J 15/10 29/897.3 |
| 2005/0116105 | A1 * | 6/2005 | Munk | B64F 5/10 244/123.8 |
| 2008/0245468 | A1 * | 10/2008 | Kato | C09J 5/06 156/92 |
| 2008/0256788 | A1 | 10/2008 | Glazebrook | |
| 2009/0282668 | A1 | 11/2009 | Sanchez-Brunete Alvarez | |
| 2010/0283195 | A1 | 11/2010 | Hazlehurst et al. | |
| 2010/0308171 | A1 * | 12/2010 | Kelley | B23P 19/04 244/132 |
| 2013/0185918 | A1 * | 7/2013 | Yamane | B23P 19/10 29/464 |
| 2014/0325813 | A1 * | 11/2014 | Batt | B23P 13/00 29/428 |
| 2014/0328655 | A1 * | 11/2014 | Nou | B62B 3/04 414/399 |
| 2015/0026959 | A1 * | 1/2015 | Dumas | B25B 11/00 29/559 |
| 2015/0266147 | A1 * | 9/2015 | Reid | B23P 21/004 29/525.01 |
| 2015/0298824 | A1 * | 10/2015 | Larson | B64F 5/10 29/559 |
| 2015/0314891 | A1 * | 11/2015 | Cobb | B64F 5/10 700/97 |
| 2015/0344154 | A1 * | 12/2015 | Larson | B23Q 1/035 29/559 |
| 2016/0137315 | A1 * | 5/2016 | Noel | B64F 5/50 269/17 |
| 2016/0243702 | A1 * | 8/2016 | Crothers | B25J 9/009 |
| 2016/0325851 | A1 * | 11/2016 | Turner | G05B 19/41805 |
| 2017/0225770 | A1 * | 8/2017 | Kooiman | B64C 3/26 |

OTHER PUBLICATIONS

International Search Report and Writtten Opinion of International Application No. PCT/GB2016/052367, dated Oct. 18, 2016, 13 pages.
Great Britain Search Report under Section 17 of Great Britain Application No. GB1513823.3, dated Jan. 22, 216, 3 pages.
European Search Report of European Application No. EP15275184.8, dated Jan. 8, 2016, 8 pahes.

* cited by examiner

AIRCRAFT PART ASSEMBLY

RELATED APPLICATIONS

This application is a National Phase application filed under 35 U.S.C §371 of PCT Application No. PCT/GB2016/052367 with an International filing date of Aug. 1, 2016, which claims priority of GB Patent Application GB1513823.3 filed Aug. 5, 2015 and EP Patent Application EP15275184.8 filed Aug. 5, 2015. Each of these applications is herein incorporated by reference in its entirety for all purposes.

FIELD OF THE INVENTION

The present invention relates to the assembly of aircraft parts including aircraft empennages.

BACKGROUND

Aircraft assembly tools are typically used to support aircraft components while they are being worked on, and to locate different components together in the correct relative positions during assembly of aircraft parts. Such assembly tools have to be manufactured to exacting standards.

A conventional assembly tool comprises a rigid metal jig whose framework is constructed from welded box section steel. A plurality of pick-up devices is mounted on the framework for carrying the aircraft components during the assembly process.

SUMMARY OF THE INVENTION

In a first aspect, the present invention provides a method of producing at least part of an aircraft, the method comprising: providing a frame, the frame comprising a first surface, a second surface opposite to the first surface, and one or more side edges disposed between the first surface and the second surface; mounting the frame to a first tool, the first tool comprising a support surface that contacts at least part of the second surface of the frame, thereby opposing movement of the frame at least in a direction perpendicular to the second surface; while the frame is mounted to the first tool, machining, using a cutting tool, at least part of the first surface of the frame to form one or more attachment features; mounting the machined frame to a second tool, the second tool being configured to contact the frame along only the one or more side edges of the frame; and, while the frame is mounted to the second tool, using the attachment features, attaching to the first surface and the second surface, aircraft panels to form an outer skin of the at least part of the aircraft.

The at least part of the aircraft may be at least part of an aircraft empennage.

The method may further comprise, between the steps of machining at least part of the first surface and mounting the machined frame to the second tool: re-mounting the frame to the first tool such that the support surface contacts at least part of the first surface of the frame, thereby opposing movement of the frame at least in a direction perpendicular to the first surface; and, while the frame is re-mounted to the first tool, machining, using the cutting tool, at least part of the second surface of the frame to form one or more further attachment features. The method may further comprise attaching aircraft panels to the first surface and the second surface using the further attachment features in addition to the attachment features.

The first tool may comprise a plurality of pickup devices, each having a respective receiving element configured to receive the frame, the receiving elements being arranged symmetrically across the first tool.

The first tool may comprise a first plurality of pickup devices for receiving the frame. The second tool comprises a second plurality of pickup devices for receiving the frame. The pickup devices in the first and second pluralities may be of uniform construction.

The step of providing the frame may comprise: providing a plurality of frame components that are to be assembled together to form the frame; calculating a plurality of predetermined positions and corresponding orientations at which the frame is to be supported; producing the first tool, the first tool comprising the support surface and a plurality of pickup devices, each pickup device comprising a respective element; configuring the first tool for receiving the plurality of frame components by adjusting the receiving elements until each receiving element is aligned with respect to a respective predetermined position and corresponding orientation; mounting the plurality of frame components to the first tool; and, while the plurality of frame components are mounted to the first tool, assembling together the plurality of frame components so as to produce the frame.

The step of machining the frame may be performed relative to a datum defined by at least part of the first tool.

The step of attaching aircraft panels to the first surface and the second surface may comprise: attaching a first aircraft panel to the first surface, and, at the same time as attaching the first aircraft panel to the first surface, attaching a second aircraft panel to the second surface.

The method may further comprise, while the frame is mounted to the first tool, using the second tool to perform an assembly process on a further at least part of an aircraft.

The method may further comprise, while the frame is mounted to the second tool, using the first tool to perform an assembly process and/or a machining process to produce a further frame.

The first tool and the second tool may be configured to hold the frame at at least one common position on the frame. For example, the first tool and the second tool may engage with the frame at the same positions on the frame.

The method may further comprise, after machining the frame, transferring the frame from being mounted to the first tool to being mounted to the second tool.

The first tool may comprise the second tool and the support surface, the support surface being removably attached to the second tool. The step of mounting the machined frame to the second tool may comprise detaching the support surface from the second tool such that the support surface no longer contacts the frame.

In a further aspect, the present invention provides at least part of an aircraft empennage produced using a method according to the above aspect.

In a further aspect, the present invention provides apparatus for producing at least part of an aircraft, the apparatus comprising: means for providing a frame, the frame comprising a first surface, a second surface opposite to the first surface, and one or more side edges disposed between the first surface and the second surface; a first tool configured to receive the frame such that a support surface of the first tool contacts at least part of the second surface of the frame, thereby opposing movement of the frame at least in a direction perpendicular to the second surface; a cutting tool configured, while the frame is mounted to the first tool, to machine at least part of the first surface of the frame to form one or more attachment features; a second tool configured to receive the machined frame, the second tool being configured to contact the frame along only the one or more side edges of the frame; and means for performing an assembly process configured, while the frame is mounted to the second tool, using the attachment features, to attach to the first surface and the second surface, aircraft panels to form an outer skin of the at least part of the aircraft.

DETAILED DESCRIPTION

Figure 1:
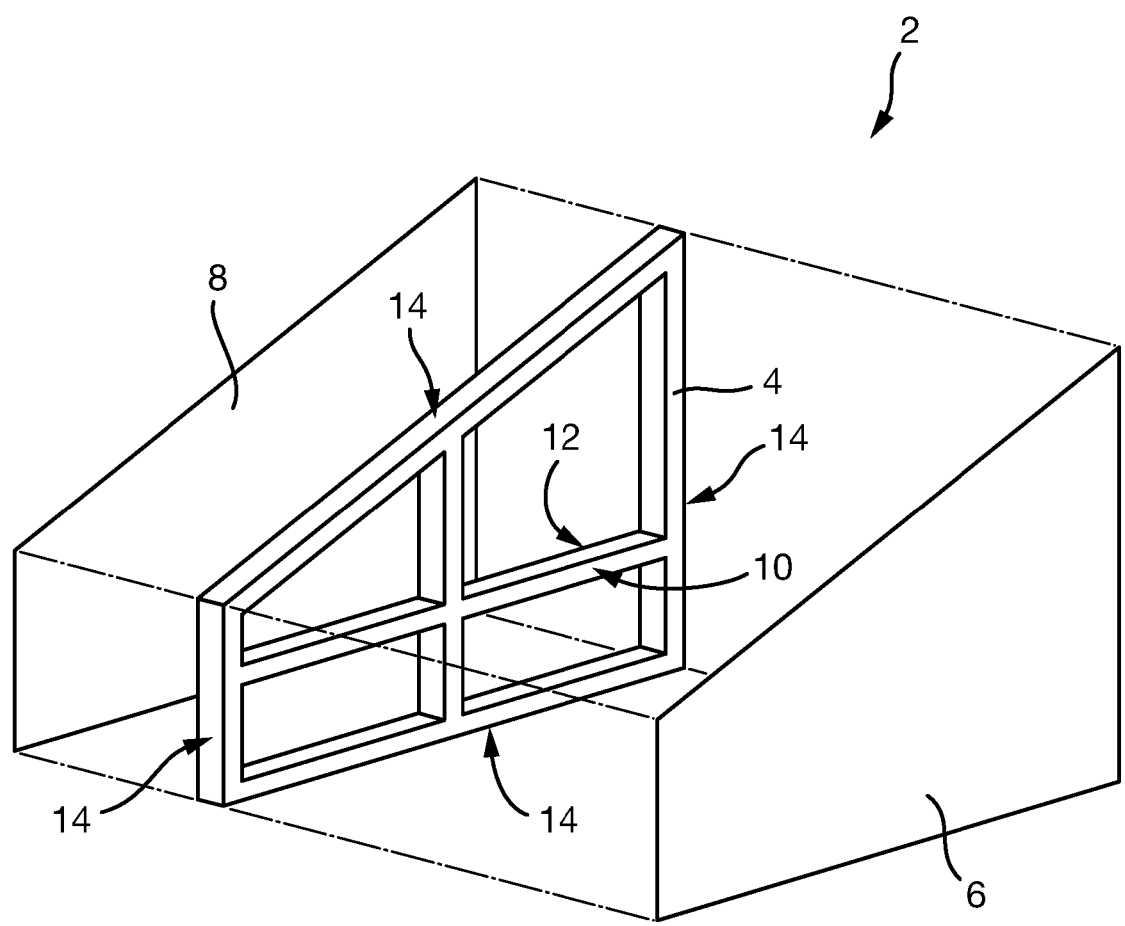
FIG. 1 is a schematic illustration (not to scale) of an exploded perspective view of at least part of an aircraft empennage.

In the following description, like reference numerals refer to like elements.

The following description is based on embodiments of the invention and should not be taken as limiting the invention with regard to alternative embodiments that are not explicitly described herein.

It will be appreciated that relative terms such as top and bottom, front and rear, and so on, are used merely for ease of reference to the Figures, and these terms are not limiting as such, and any two differing directions or positions and so on may be implemented.

FIG. 1 is a schematic illustration (not to scale) of an exploded view of at least part of an aircraft empennage, hereinafter referred to as "the empennage" and indicated in the Figures by the reference numeral 2. An embodiment of a method of producing the empennage 2 is described in more detail later below with reference to FIG. 2.

In this embodiment, the empennage 2 comprises a frame 4, a front skin 6, and a rear skin 8.

The frame 4 comprises a plurality of beams that are attached together to form a support structure to which the external skins 6, 8 are attached. The frame 4 is made of aluminium. The frame 4 comprises a front surface 10 and a rear surface 12, the rear surface being opposite to the front surface 10. The frame further comprises side edges 14 that separate the front and rear surfaces 10, 12. In other words, the side edges 14 of the frame 4 are disposed between the front and rear surfaces 10, 12 to which the front skin 6 and the rear skin 8 attach. The side edges are contiguous with the front and rear surfaces 10, 12.

The front skin 6 comprises one or more panels made of a composite material in particular a carbon fibre-reinforced polymer, i.e. a polymer matrix reinforced with carbon fibres. The front skin 6 is moulded into a shape that conforms to the front surface 10 of the frame 4. The front skin 6 is attached to the front surface 10 of the frame 4 as described in more detail later below with reference to FIG. 2.

The rear skin 8 comprises one or more panels made of a composite material in particular a carbon fibre-reinforced polymer, i.e. a polymer matrix reinforced with carbon fibres.

The rear skin 8 is moulded into a shape that conforms to the rear surface 12 of the frame 4. The rear skin 8 is attached to the rear surface 12 of the frame 4 as described in more detail later below with reference to FIG. 2.

Figure 2:
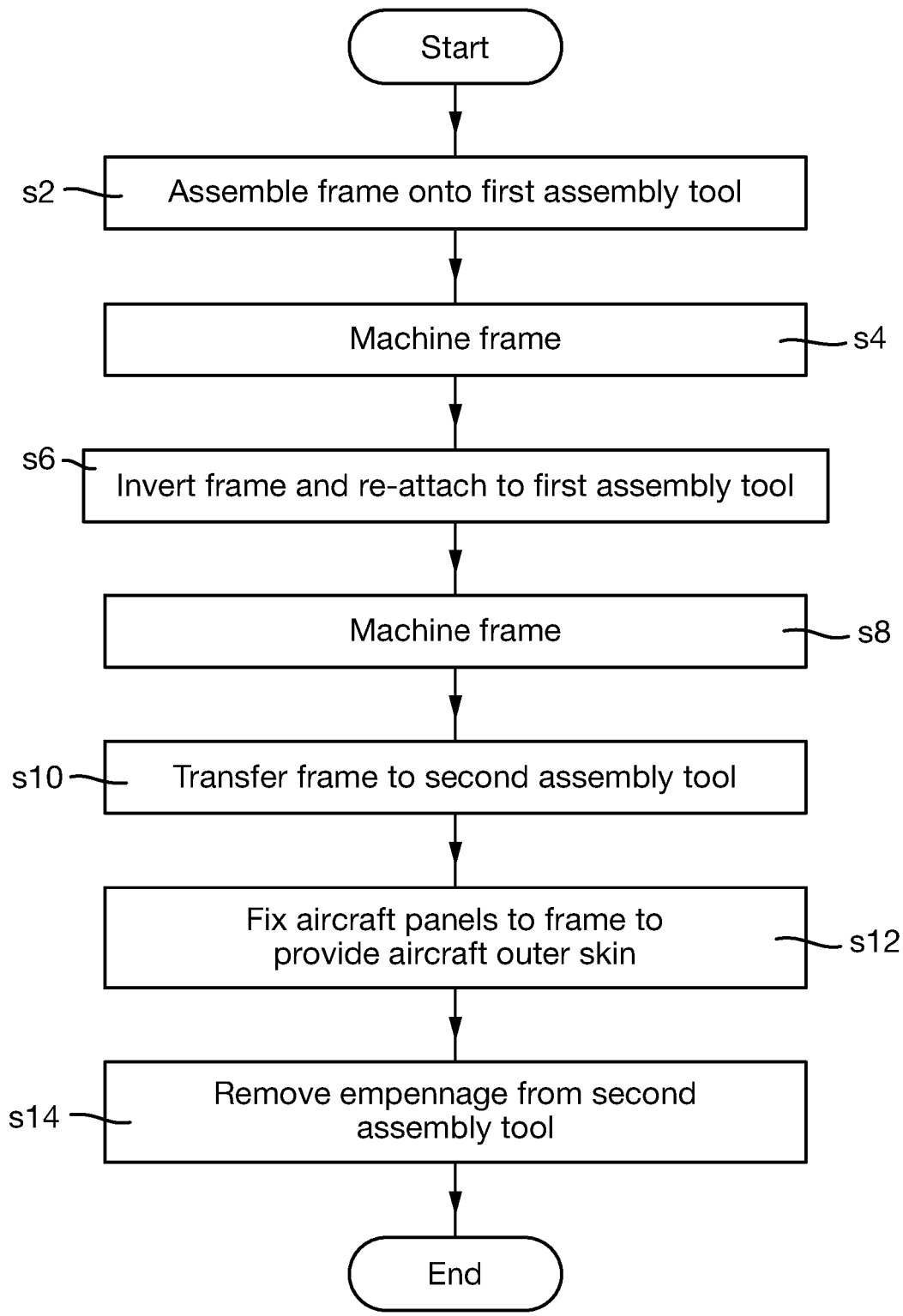
FIG. 2 is a process flow chart showing certain steps of an embodiment of a process of producing the at least part of the empennage.

FIG. 2 is a process flow chart showing certain steps of an embodiment of a process of producing the aircraft empennage 2.

At step s2, the frame 4 is assembled using a first assembly tool.

Figure 3:
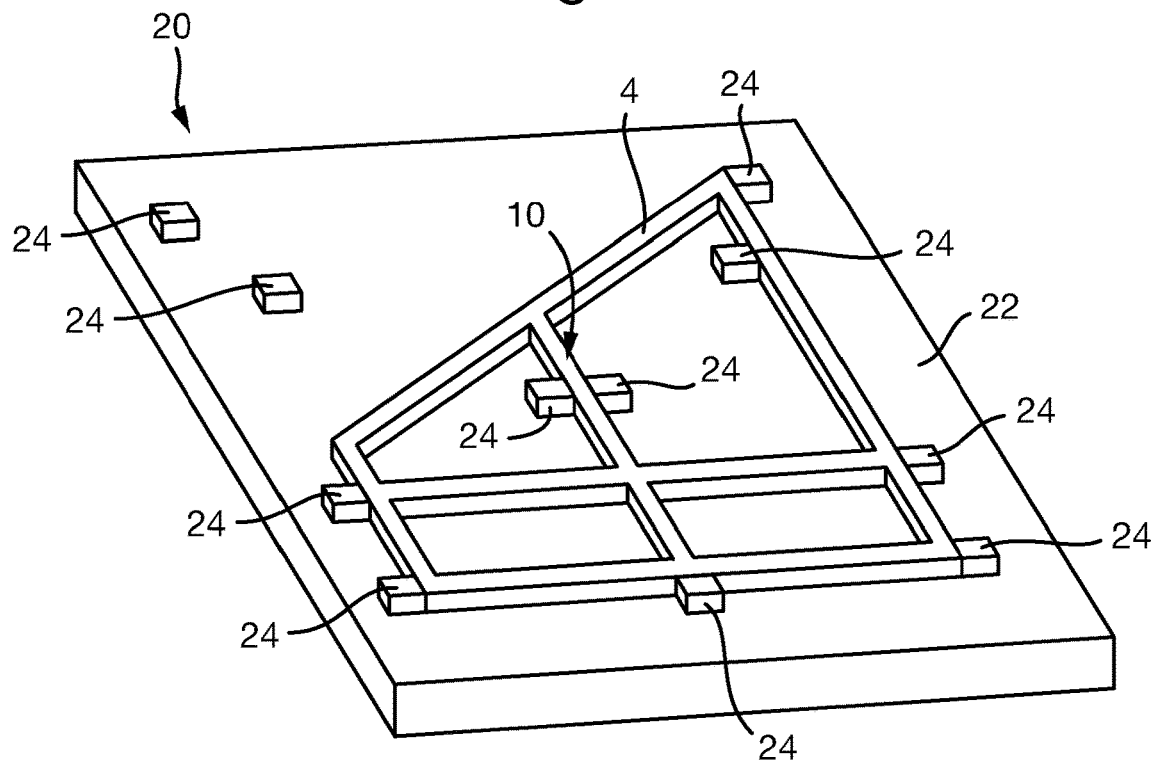
FIG. 3 is a schematic illustration (not to scale) showing a first assembly tool with a frame of the empennage assembled thereon.

FIG. 3 is a schematic illustration (not to scale) showing the first assembly tool 20 with the frame 4 assembled thereon.

The first assembly tool 20 comprises a substantially rigid base portion 22 and a plurality of pickup devices, hereinafter referred to as the "first pickups" 24.

The base portion 22 is a thick, rigid member that is resistant to deformation during machining operations.

The first pickups 24 are attached to the upper surface of the base portion 22. Preferably, the first pickups 24 are of universal construction. In this embodiment, each first pickup 24 comprises a receiving element for receiving and retaining a part of the frame 4. Each of the first pickups 24 may be configured to allow six degrees of freedom of movement of its receiving element around three orthogonal axes. Examples of appropriate jig pickups include, but are not limited to, those described in EP1230124 and EP1600379, each of which is incorporated in its entirety herein by reference. The pick-up devices may be formed from aluminium.

In this embodiment, the first pickups 24 are attached to the base portion 22 such that the receiving elements have predetermined positions and orientations relative to one another. This may be accomplished by setting the receiving elements approximately in their predetermined positions and orientations relative to one another, and iterating the steps of measuring the actual positions and orientations of the receiving elements and moving them towards the predetermined positions and orientations until the predetermined relative positions and orientations are achieved. The predetermined relative positions and orientations of the receiving elements of the first pickups 24 may be based upon a digital model of the frame 4.

During assembly of the frame 4 on the first assembly tool 20, the aircraft components that form the frame 4 are received by the first pickups 24. The first pickups 24 are fixed at predetermined relative positions and orientations such that they hold the aircraft components that form the frame 4 at predetermined precise points of their structures and in predetermined precise directions. Once held by the first pickups 24, the aircraft components of the frame 4 may be attached together, for example, using bolts or fasteners. In some embodiments, a laser tracker or other measuring device is used to check that the frame 4 is assembled with the necessary precision.

In this embodiment, at step s2, the frame 4 is held by the first pickups 24 against the upper surface of the base portion 22. In particular, the rear surface 12 of the frame 4 is held against the base portion 22 such that the front surface 10 of the frame 4 is accessible.

In this embodiment, at step s2 (and during the subsequent machining step s4), the entirety of the rear surface 12 of the frame 4 is in contact with the upper surface of the base portion 22. However, in other embodiments, only part of the rear surface 12 of the frame 4 is in contact with the upper surface of the base portion 22.

The rear surface 12 of the frame 4 may conform to, i.e. may be substantially the same shape as, the upper surface of the base portion 22 against which it is fixed.

At step s4, the front surface 10 of the frame 4 is machined using a cutting device. In this embodiment, a plurality of holes that are to be used to fasten the external skins 6, 8 to the frame 4 is machined through the front surface 10 of the frame 4.

Advantageously, the frame 4 being held against the rigid base portion 22 during machining tends to provide that forces normal to the front surface 10, that are exerted on the frame 4 during machining, tend not to cause deformation of the frame 4. Thus, the predetermined positions and orientation of the component parts of the frame 4 advantageously tend to be preserved during machining.

The first pickups 24 are configured to securely hold the frame 4 to prevent or oppose movement or deflection of the frame 4 while the frame 4 is being machined.

At step s6, the frame 4 is removed from the first assembly tool 20, inverted, and re-fixed to the first assembly tool 20.

Figure 4:
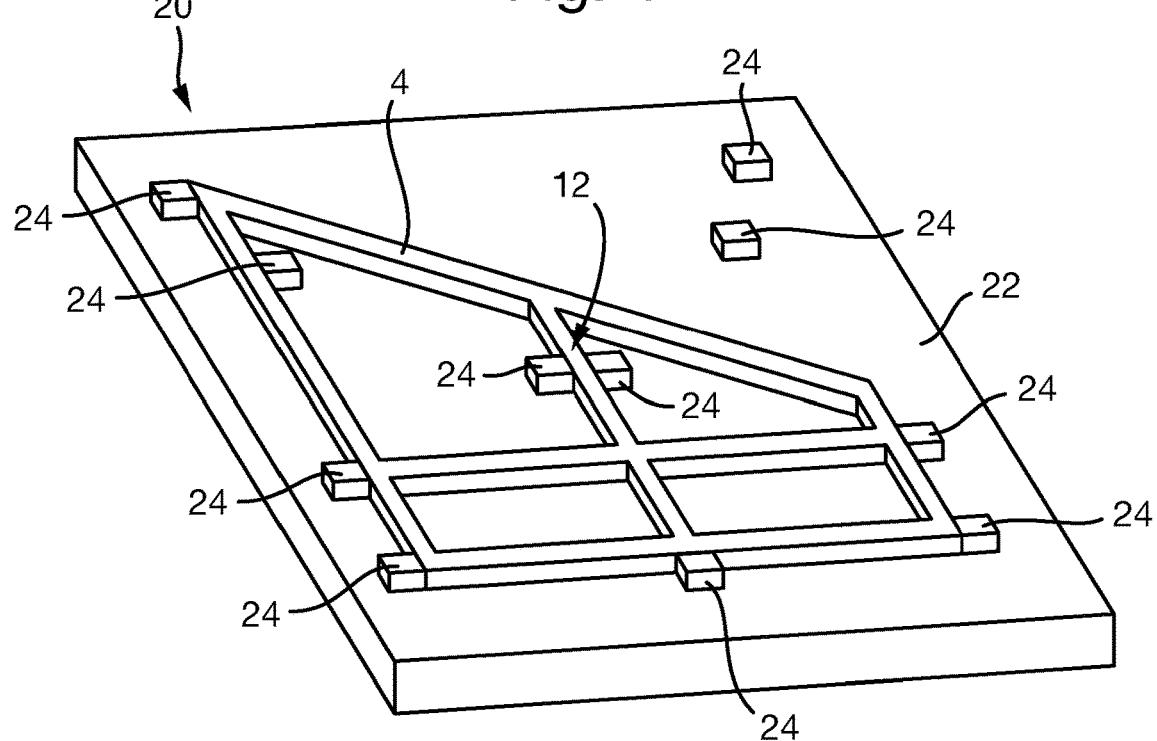
FIG. 4 is a further schematic illustration (not to scale) showing the first assembly tool with the frame assembled thereon.

FIG. 4 is a schematic illustration (not to scale) showing the first assembly tool 20 with the inverted frame 4 attached thereto.

In this embodiment, the first pickups 24 are arranged on the base portion 22 such that, when the frame 4 is inverted and re-attached to the first assembly tool 20, the components of the frame 4 are held by the first pickups 24 at the same predetermined precise points of their structures and in the same predetermined precise directions relative to one another as in steps s2 and s4. In this embodiment, this is facilitated by the first pickups 24 having a symmetrical arrangement on the upper surface of the base portion 22, for example, about a central line of the upper surface of the base portion 22. However, in other embodiments, when the frame 4 is inverted and re-attached to the first assembly tool 20, the frame 4 is held in a different way by the first pickups 24, while still maintaining that the aircraft components that form the frame 4 maintain the same relative positions and orientations. In some embodiments, a laser tracker or other measuring device is used to check that the frame 4 relative positions of the different components that make up the frame are positions relative to one another with the necessary precision.

In this embodiment, at step s6, the frame 4 is held by the first pickups 24 against the upper surface of the base portion 22. In particular, the front surface 10 of the frame 4 is held against the base portion 22 such that the rear surface 12 of the frame 4 is accessible.

In this embodiment, at step s6 (and during the subsequent machining step s8), the entirety of the front surface 10 of the frame 4 is in contact with the upper surface of the base portion 22. However, in other embodiments, only part of the front surface 10 of the frame 4 is in contact with the upper surface of the base portion 22.

The front surface 10 of the frame 4 may conform to, i.e. may be substantially the same shape as, the upper surface of the base portion 22 against which it is fixed.

At step s8, the rear surface 12 of the frame 4 is machined using a cutting device. In this embodiment, a plurality of holes that are to be used to fasten the external skins 6, 8 to the frame 4 is machined through the rear surface 12 of the frame 4.

Advantageously, the frame 4 being held against the rigid base portion 22 during machining tends to provide that forces normal to the rear surface 12, which are exerted on the frame 4 during machining, tend not to cause deformation of the frame 4. Thus, the predetermined positions and orientation of the component parts of the frame 4 advantageously tend to be preserved during machining.

At step s10, the machined frame 4 is removed from the first assembly tool 20 and transferred to a second assembly tool. After removal of the frame 4 from the first assembly tool 20, the first assembly tool 20 may be reused for the assembly and machining of a further frame, as part of an efficient assembly line empennage production process.

Figure 5:
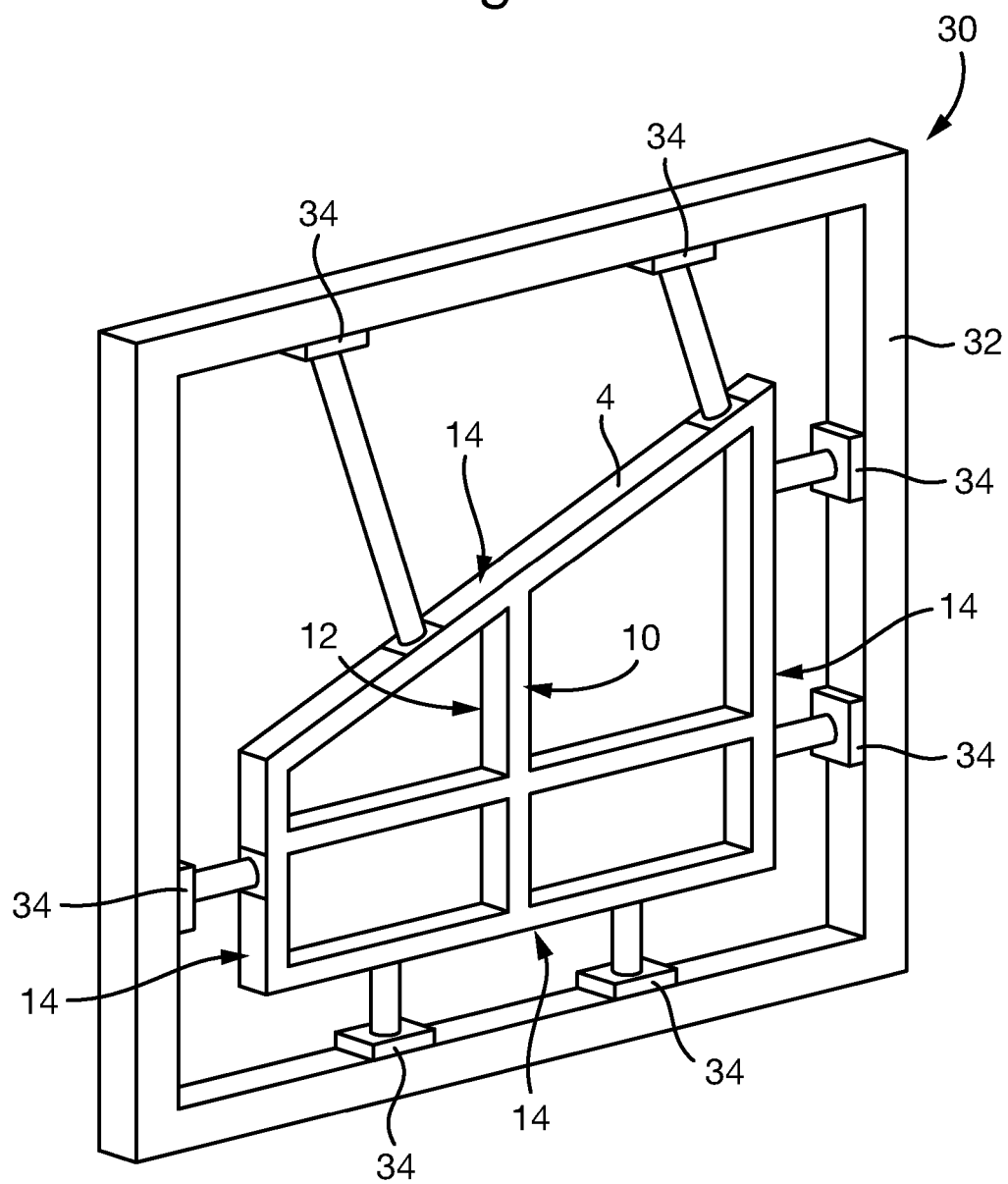
FIG. 5 is a schematic illustration (not to scale) showing a second assembly tool with the frame attached thereto.

FIG. 5 is a schematic illustration (not to scale) showing the second assembly tool 30 with the frame 4 attached thereto.

The second assembly tool 30 comprises a substantially rigid fixture frame 32 and a plurality of pickup devices, hereinafter referred to as the "second pickups" 34.

The fixture frame 32 is a rigid structure that is resistant to deformation during assembly operations. In this embodiment, the fixture frame is constructed from lengths of extruded aluminium section that are welded together. However, in other embodiments, the fixture frame is constructed from a different appropriate material and/or in a different way. For example, the fixture frame 32 may be a steel jig frame comprising a plurality of steel beams that may be attached together (e.g. by welding) to form a rectangular parallelepiped.

The second pickups 34 are securely attached to fixture frame 32, for example, by welding. Preferably, the second pickups 34 are of universal construction and may be of the same construction as the first pickups 24. In this embodiment, each second pickup 34 comprises a receiving element for receiving and retaining a part of the frame 4. Each of the second pickups 34 may be configured to allow six degrees of freedom of movement of its receiving element around three orthogonal axes. Examples of appropriate jig pickups include, but are not limited to, those described in EP1230124 and EP1600379, each of which is incorporated in its entirety herein by reference. The pick-up devices may be formed from aluminium.

In this embodiment, the second pickups 34 are attached to the fixture frame 32 such that their receiving elements have predetermined positions and orientations relative to one another. This may be accomplished by setting the receiving elements approximately in their predetermined positions and orientations relative to one another, and iterating the steps of measuring the actual positions and orientations of the receiving elements and moving them towards the predetermined positions and orientations until the predetermined relative positions and orientations are achieved. The predetermined relative positions and orientations of the receiving elements of the second pickups 34 may be based upon a digital model of the frame 4.

In this embodiment, the frame 4 is received by the receiving elements of the second pickups 34. The second pickups 34 are fixed at predetermined relative positions and orientations such that they hold the frame 4 at predetermined precise points of on the frame and in predetermined precise directions.

In this embodiment, the points on the frame 4 at which the frame 4 is supported by the second pickups 34 are along the side edges 14 of the frame 4 only. Thus, in this embodiment, the second assembly tool 30 does not attached to the frame 4 at a point on either the front surface 10 or the rear surface 12 of the frame 4. Thus, the front and rear surfaces 10, 12 of the frame are unobstructed by the second assembly tool 30. The second assembly tool 30 may be thought of as a "peripheral assembly tool".

In this embodiment, at step s10, the frame 4 is held by the second pickups 34 such that the front and rear surfaces 10, 12 are not contacted by the second assembly tool 30, and such that they are both accessible during the subsequent assembly step s12.

At step s12, the external skins 6, 8 are attached to the frame 4.

In this embodiment, the front skin 6 is attached to the front surface 10 of the frame 4 using a first plurality of fasteners attached through the plurality of holes that were machined through the front surface 10 of the frame 4 at step s4. Also, in this embodiment the rear skin 8 is attached to the rear surface 12 of the frame 4 using a second plurality of fasteners attached through the plurality of holes that were machined through the rear surface 12 of the frame 4 at step s8. Thus, the empennage 2 is assembled.

In some embodiments, a laser tracker or other measuring device is used to check that the skins 6, 8 are attached to the frame 4 with the necessary precision.

At step s14, the assembled empennage 2 is removed from the second assembly tool 30. After removal of the empennage 2 from the second assembly tool 30, the second assembly tool 30 may be reused for the assembly of a further empennage, as part of an efficient assembly line empennage production process.

Thus, a process of producing the aircraft empennage 2 is provided.

Advantageously, the above described first assembly tool supports the frame behind or below the points on the frame that are machined. Thus, movement of the frame in the direction along which the frame is machined into (e.g. perpendicular to the upper surface of the base portion of the first assembly tool) tends to be opposed or prevented. Thus, the likelihood of damage to the frame occurring as a result of bending forces exerted during machining of the frame tends to be reduced or eliminated. Were the frame to be machined while held by a tool that only supports the frame only along its side edges (e.g. the second assembly tool), movement of parts of the frame in the machining direction may be possible and the frame may be deformed and damaged.

Advantageously, the above described second assembly tool holds the frame only along its side edges such that the front and rear surfaces of the frame, to which the external skin are to be fastened, are accessible. Thus, the fixing of the front and rear skins to the frame is not opposed to any extent. Thus, it tends to be possible to attach both front and rear skins to the frame without having to adjust the mounting of the frame to the second assembly tool. This tends to facilitate efficient assembly. Also, it tends to be possible to fix the front and rear skins to the frame at the same time, as both front and rear surfaces may be accessed at the same time. Were the front and rear skins to be fastened to the frame while the frame is held by a tool that does not only supports the frame only along its side edges (e.g. the first assembly tool), only one of the front or rear surfaces of the frame would be accessible at a time, and thus assembly time would tend to be increased.

Transfer of the frame from the first assembly tool to the second assembly tool tends to be easy. Such transfer is facilitated by using pickups of the same construction on both the first assembly tool and the second assembly tool. Furthermore, in some embodiments the first pickups and the second pickups are arranged on the first and second assembly tools respectively such that they attach to at least some of the same points on the frame. This tends to facilitate transfer of the frame between the first and second assembly tool. The frame may also include features that facilitate its attachment to the pickup devices at some or all of these points.

The above described method and apparatus advantageously tends to provide for efficient empennage production. The use of separate tools for the machining of the frame and the attachment of the skins to the frame provides that the machining process and the skin-assembly process may be carried out on different empennage assemblies simultaneously or at least overlapping to some extent temporally.

In the above embodiments, machining of the frame on the first assembly is performed relative to a datum which may be defined relative to part of the first assembly tool. Thus, having the frame assembled and machined on the same tool (which may be used to define the machining datum) tends to provide that slight deviations in frames (e.g. caused by manufacturing and/or assembly errors) do not adversely affect the relative positions of the pluralities of holes that are machined into the frame and to which the external skins are attached.

Advantageously, the positions at which the pickup devices engage the empennage, and the orientation of the pickup devices at these positions, are highly accurately determined.

Apparatus, including the any processors for controlling the machining device used to machine the frame, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the above described assembly tools are specifically designed for the assembly of a particular aircraft component, or a small range of components, in this instance being for the assembly of at least part of an aircraft empennage. The precise design of the assembly tools including the locations and orientations of the pickup devices may be different for the assembly of another part of an aircraft. Other aircraft parts that may be produced using the above described apparatus and process may have a different construction to that of the empennage described above.

In the above embodiments, two different assembly tools are used in the production of the empennage. However, in other embodiments, a different number of assembly tools is used.

For example, in some embodiments, three assembly tools may be used: an assembly tool for the assembly of the frame and the machining of the front surface of the assembled frame; a further assembly tool for the machining of the rear surface of the frame, and a second further assembly tool for the attachment of the external skins to the machined frame.

In some embodiments, only a single assembly tool is used. In such embodiments, the single assembly tool may include the components of the above described second assembly tool (i.e. the fixture frame and the pickups that attach to the side edges of the frame), and a support portion or plate that is configured to removably attach to the fixture frame. When the support portion is attached to the fixture frame, the support portion contacts the front or rear surface of the frame, thereby providing support to the frame during machining and preventing deformation of the frame in a similar way to that described above with reference to FIGS. 3 and 4. When the support portion is removed from the fixture frame, both front and rear surfaces of the frame are accessible as described in more detail earlier above with reference to FIG. 5, thus allowing for the easy attachment of the external skins to the frame. The support portion may include one or more additional pickup devices for fixing the position of the frame.

The invention claimed is:

1. A method of producing at least part of an aircraft, the method comprising:
    providing a frame, the frame comprising a first surface, a second surface opposite to the first surface, and one or more side edges disposed between the first surface and the second surface;
    mounting the frame to a first tool, the first tool comprising a support surface that contacts at least part of the second surface of the frame, thereby opposing movement of the frame at least in a direction perpendicular to the second surface;
    while the frame is mounted to the first tool, machining at least part of the first surface of the frame to form one or more attachment features;
    transferring the machined frame to a second tool, the second tool being configured to contact the frame at only the one or more side edges of the frame; and
    while the frame is mounted to the second tool, attaching, using the attachment features, to the first surface, aircraft panels to form an outer skin of the at least part of the aircraft,
    wherein the method further comprises, between the steps of machining at least part of the first surface and mounting the machined frame to the second tool:
    re-mounting the frame to the first tool such that the support surface contacts at least part of the first surface of the frame, thereby opposing movement of the frame at least in a direction perpendicular to the first surface; and
    while the frame is re-mounted to the first tool, machining, using the cutting tool, at least part of the second surface of the frame to form one or more further attachment features; and
    attaching aircraft panels to the first surface and the second surface uses the further attachment features in addition to the attachment features.

2. The method according to claim 1, wherein the at least part of the aircraft is at least part of an aircraft empennage.

3. The method according to claim 1, wherein the first tool comprises a plurality of pickup devices, each having a respective receiving element configured to receive the frame, the receiving elements being arranged symmetrically across the first tool.

4. The method according to claim 1, wherein:
    the first tool comprises a first plurality of pickup devices for receiving the frame; and
    the second tool comprises a second plurality of pickup devices for receiving the frame.

5. The method according to claim 1, wherein
    the step of providing the frame comprises:
    providing a plurality of frame components that are to be assembled together to form the frame; and
    calculating a plurality of predetermined positions and corresponding orientations at which the frame is to be supported,
    and wherein the first tool further comprises a plurality of pickup devices, each pickup device comprising a respective element,
    and wherein the step of mounting the frame to the first tool further comprises:
    configuring the first tool for receiving the plurality of frame components by adjusting the receiving elements until each receiving element is aligned with respect to a respective predetermined position and corresponding orientation;
    mounting the plurality of frame components to the first tool; and
    while the plurality of frame components are mounted to the first tool, assembling together the plurality of frame components so as to produce the frame.

6. The method according to claim 1, wherein the step of machining the frame is performed relative to a datum defined by at least part of the first tool.

7. The method according to claim 1, wherein the step of attaching aircraft panels to the first surface and the second surface comprises:
    attaching a first aircraft panel to the first surface; and
    at the same time as attaching the first aircraft panel to the first surface, attaching a second aircraft panel to the second surface.

8. The method according to claim 1, the method further comprising, while the frame is mounted to the first tool, using the second tool to perform an assembly process on a further at least part of an aircraft.

9. The method according to claim 1, the method further comprising, while the frame is mounted to the second tool, using the first tool to perform an assembly process and/or a machining process on a further frame.

10. The method according to claim 1, wherein the first tool and the second tool are configured to hold the frame at at least one common position on the frame.

11. The method according to claim 1, wherein
    the first tool comprises:
    the second tool; and
    the support surface, the support surface being removably attached to the second tool; and
    the step of transferring the machined frame to the second tool comprises detaching the support surface from the second tool such that the support surface no longer contacts the frame.

12. An apparatus for producing at least part of an aircraft, the apparatus comprising:
    a first tool configured to receive a frame, the frame comprising a first surface, a second surface opposite to the first surface, and one or more side edges disposed between the first surface and the second surface, such that a support surface of the first tool contacts at least part of the second surface of the frame, thereby opposing movement of the frame at least in a direction perpendicular to the second surface;
    a cutting tool configured to, while the frame is mounted to the first tool, machine at least part of the first surface of the frame to form one or more attachment features and, following reattachment of the first tool to the frame, such that the support surface of the first tool contacts at least part of the first surface of the frame, machine at least part of the second surface of the frame to form one or more further attachment features;

a second tool configured to receive the machined frame, the second tool being configured to contact the frame only at the one or more side edges of the frame; and an assembly tool configured, while the frame is mounted to the second tool, using the attachment features and further attachment features, to attach to the first surface and the second surface, aircraft panels to form an outer skin of the at least part of the aircraft.

13. The method according to claim 1, wherein machining is performed using a cutting tool.

14. The method according to claim 1, wherein the support surface of the first tool contacts the entire second surface of the frame.

15. The method according to claim 1, wherein the second tool provides unobstructed access to the first and second surfaces of the frame.

16. The method according to claim 1 wherein the second tool does not cover any portion of the first and second surfaces of the frame.

17. A method of producing at least part of an aircraft, the method comprising:

providing a frame, the frame comprising a first surface, a second surface opposite to the first surface, and one or more side edges disposed between the first surface and the second surface;

mounting the frame to a first tool, the first tool comprising a support surface that contacts at least part of the second surface of the frame, thereby opposing movement of the frame at least in a direction perpendicular to the second surface;

while the frame is mounted to the first tool, machining at least part of the first surface of the frame to form one or more attachment features;

transferring the machined frame to a second tool, the second tool being configured to contact the frame at only the one or more side edges of the frame; and while the frame is mounted to the second tool, attaching, using the attachment features, to the first surface, aircraft panels to form an outer skin of the at least part of the aircraft, wherein the first tool comprises:

the second tool; and the support surface, the support surface being removably attached to the second tool, and wherein the step of transferring the machined frame to the second tool comprises detaching the support surface from the second tool, such that the support surface no longer contacts the frame.

* * * * *